(12) United States Patent
Liu et al.

(10) Patent No.: US 11,500,992 B2
(45) Date of Patent: Nov. 15, 2022

(54) TRUSTED EXECUTION ENVIRONMENT-BASED MODEL TRAINING METHODS AND APPARATUSES

(71) Applicant: ALIPAY (HANGZHOU) INFORMATION TECHNOLOGY CO., LTD., Zhejiang (CN)

(72) Inventors: Yongchao Liu, Hangzhou (CN); Bei Jia, Hangzhou (CN); Yue Jin, Hangzhou (CN); Chengping Yang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,946

(22) Filed: Jun. 28, 2021

(65) Prior Publication Data

US 2022/0092185 A1  Mar. 24, 2022

(30) Foreign Application Priority Data

Sep. 23, 2020  (CN) .......................... 202011012420.3

(51) Int. Cl.
*G06F 21/53* (2013.01)
*G06F 21/57* (2013.01)
(Continued)

(52) U.S. Cl.
CPC .............. *G06F 21/57* (2013.01); *G06F 21/53* (2013.01); *G06F 21/602* (2013.01); *G06K 9/6232* (2013.01); *G06K 9/6256* (2013.01)

(58) Field of Classification Search
CPC ........ G06F 21/60; G06F 21/602; G06F 21/53; G06F 21/57; G06K 9/6217; G06K 9/6232; G06K 9/6256
See application file for complete search history.

(56) References Cited

U.S. PATENT DOCUMENTS

| 10,831,444 B2* | 11/2020 | El-Yaniv | G06N 3/0454 |
| 2008/0027887 A1* | 1/2008 | Barbu | G06N 20/20 706/25 |

(Continued)

FOREIGN PATENT DOCUMENTS

| CN | 109308418 A | 2/2019 |
| CN | 110728375 A | 1/2020 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Khang Do
(74) *Attorney, Agent, or Firm* — Fish & Richardson P.C.

(57) ABSTRACT

The present specification discloses a trusted execution environment (TEE)-based model training method and apparatus. In one or more embodiments, the method includes: obtaining encrypted target samples from an encrypted training sample set in a first execution environment, inputting the encrypted target samples into a second execution environment that is a trusted execution environment (TEE) different from the first execution environment, decrypting the encrypted target samples in the TEE to obtain decrypted target samples, inputting the decrypted target samples into a feature extraction model in the TEE to determine sample features, determining the sample features output from the TEE as target sample features for a current iteration of a training process for a target model, and performing, based on the target sample features, the current iteration on the target model in the first execution environment.

16 Claims, 7 Drawing Sheets

(51) Int. Cl.
*G06F 21/60* (2013.01)
*G06K 9/62* (2022.01)

(56) References Cited

U.S. PATENT DOCUMENTS

| | | | | |
|---|---|---|---|---|
| 2017/0372226 | A1* | 12/2017 | Costa | G06F 21/60 |
| 2018/0024512 | A1* | 1/2018 | Piche | G06N 20/00 700/31 |
| 2019/0138934 | A1* | 5/2019 | Prakash | G06K 9/6257 |
| 2019/0296910 | A1* | 9/2019 | Cheung | H04L 9/008 |
| 2019/0318268 | A1* | 10/2019 | Wang | G06N 20/00 |
| 2019/0362130 | A1* | 11/2019 | Othman | G06V 40/11 |
| 2019/0392305 | A1* | 12/2019 | Gu | G06N 3/08 |
| 2020/0050951 | A1* | 2/2020 | Wang | G06N 20/00 |
| 2020/0050965 | A1* | 2/2020 | Harvill | G06N 5/04 |
| 2020/0082259 | A1* | 3/2020 | Gu | G06N 3/08 |
| 2020/0082270 | A1* | 3/2020 | Gu | G06F 21/602 |
| 2020/0134230 | A1* | 4/2020 | Booth, Jr. | H04W 12/0471 |
| 2020/0150622 | A1* | 5/2020 | Cai | G05B 19/4065 |
| 2020/0234198 | A1* | 7/2020 | Feng | G06F 21/6245 |
| 2020/0272934 | A1* | 8/2020 | Manamohan | G06F 11/1658 |
| 2020/0311520 | A1* | 10/2020 | Zhao | G06K 9/6262 |
| 2020/0311540 | A1* | 10/2020 | Chakraborty | G06N 3/08 |
| 2020/0311583 | A1* | 10/2020 | Manamohan | H04L 9/0643 |
| 2020/0320206 | A1* | 10/2020 | Cammarota | H04L 9/008 |
| 2020/0364608 | A1* | 11/2020 | Anwar | G06N 20/00 |
| 2020/0387777 | A1* | 12/2020 | Avestimehr | G06N 3/0472 |
| 2020/0394518 | A1* | 12/2020 | Sirdey | H04L 9/008 |
| 2020/0410288 | A1* | 12/2020 | Capota | G06F 9/5072 |
| 2021/0019667 | A1* | 1/2021 | Hudson | G06N 5/04 |
| 2021/0034985 | A1* | 2/2021 | Vongkulbhisal | G06K 9/62 |
| 2021/0042645 | A1* | 2/2021 | Sharma | G06F 16/2379 |
| 2021/0049473 | A1* | 2/2021 | Balachandar | G06N 5/046 |
| 2021/0067339 | A1* | 3/2021 | Schiatti | H04L 9/006 |
| 2021/0112038 | A1* | 4/2021 | Karame | G06F 21/6254 |
| 2021/0143987 | A1* | 5/2021 | Xu | H04L 9/083 |
| 2021/0150042 | A1* | 5/2021 | Zhang | H04L 9/0861 |
| 2021/0150269 | A1* | 5/2021 | Choudhury | G06F 21/6254 |
| 2021/0166111 | A1* | 6/2021 | Knighton, Jr. | G06N 3/063 |
| 2021/0176260 | A1* | 6/2021 | Pan | H04L 63/0853 |
| 2021/0264255 | A1* | 8/2021 | Yoo | H04L 25/0224 |
| 2021/0287114 | A1* | 9/2021 | Zhou | G06N 5/04 |
| 2021/0295201 | A1* | 9/2021 | Kim | G06K 9/6274 |
| 2021/0303695 | A1* | 9/2021 | Grosse | G06N 3/08 |
| 2021/0304010 | A1* | 9/2021 | Sengupta | G06N 3/04 |
| 2021/0312334 | A1* | 10/2021 | Liu | H04L 9/0891 |
| 2021/0342696 | A1* | 11/2021 | Bai | G06N 3/0454 |
| 2021/0390389 | A1* | 12/2021 | Limotta | H04L 9/0643 |
| 2021/0406683 | A1* | 12/2021 | Kai | G06N 3/08 |
| 2021/0406772 | A1* | 12/2021 | Shillingford | G06N 20/00 |

FOREIGN PATENT DOCUMENTS

| | | |
|---|---|---|
| CN | 110738323 A | 1/2020 |
| CN | 111079153 A | 4/2020 |
| CN | 111291401 A | 6/2020 |
| CN | 111460453 A | 7/2020 |
| CN | 111490995 A | 8/2020 |

OTHER PUBLICATIONS

Nakamoto, "Bitcoin: A Peer-to-Peer Electronic Cash System," www.bitcoin.org, 2005, 9 pages.
Extended European Search Report in European Application No. 21180855.5, dated Nov. 19, 2021, 8 pages.

* cited by examiner

TRUSTED EXECUTION ENVIRONMENT-BASED MODEL TRAINING METHODS AND APPARATUSES

CROSS-REFERENCE TO RELATED APPLICATIONS

This application claims priority to Chinese Patent Application No. 202011012420.3, filed on Sep. 23, 2020, which is hereby incorporated by reference in its entirety.

TECHNICAL FIELD

The present specification relates to the field of network security, and in particular, to trusted execution environment (TEE)-based model training methods and apparatuses.

BACKGROUND

With development of technologies, there is an increasing variety of data in a network, and data security and data privacy are also becoming more important. In related technologies, Multi-party Computation (MPC), Federated Learning, and other methods can be used to encrypt data to ensure data security. However, when there is a very large amount of model training data, using this type of methods can cause huge calculation overheads.

SUMMARY

In view of this, the present specification provides trusted execution environment (TEE)-based model training methods and apparatuses.

Specifically, the present specification is implemented by using the following technical solutions:

A TEE-based model training method includes: multiple encrypted target samples are obtained from an encrypted training sample set; the multiple encrypted target samples are input into a TEE, the encrypted target samples are decrypted in the TEE, and the decrypted target samples are input into a feature extraction model to obtain sample features; the sample features output in the TEE are determined as target sample features used for a current iteration; and current iterative training is performed on a target model by using the target sample features.

A TEE-based model training apparatus includes the following: an acquisition unit, configured to obtain multiple encrypted target samples from an encrypted training sample set; an input unit, configured to input the multiple encrypted target samples into a TEE, decrypt the encrypted target samples in the TEE, and input the decrypted target samples into a feature extraction model to obtain sample features; a determining unit, configured to determine the sample features output in the TEE as target sample features used for a current iteration; and a training unit, configured to perform current iterative training on a target model by using the target sample features.

A TEE-based model training apparatus includes: a processor; and a memory configured to store machine executable instructions, where by reading and executing the machine executable instructions that are stored in the memory and that correspond to TEE-based model training logic, the processor is enabled to: obtain multiple encrypted target samples from an encrypted training sample set; input the multiple encrypted target samples into a TEE, decrypt the encrypted target samples in the TEE, and input the decrypted target samples into a feature extraction model to obtain sample features; determine the sample features output in the TEE as target sample features used for a current iteration; and perform current iterative training on a target model by using the target sample features.

In one or more embodiments of the present specification, multiple encrypted target samples can be obtained from an encrypted training sample set, the encrypted target samples can be input into a TEE, the encrypted target samples can be decrypted in the TEE, and the decrypted target samples can be input into a feature extraction model to obtain target sample features, thereby performing current iterative training on a target model by using the target sample features.

Compared with a procedure of training an entire target model in the TEE in related technologies, in the method, only the feature extraction step that has a smaller calculation amount is performed in the TEE, so that processing pressure of the TEE can be alleviated. In addition, only encrypted training samples and sample features instead of original training sample data are used in a normal execution environment, so that the original training sample data can be prevented from being leaked, and data security can be ensured.

DESCRIPTION OF EMBODIMENTS

Example embodiments are described in detail here, and examples of the example embodiments are presented in the accompanying drawings. When the following description relates to the accompanying drawings, unless otherwise specified, same numbers in different accompanying drawings represent same or similar elements. Implementations described in the following embodiments do not represent all implementations consistent with the present specification. On the contrary, the implementations are only examples of apparatuses and methods that are described in the appended claims in details and consistent with some aspects of the present specification.

Terms used in the present specification are only used to describe specific embodiments, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although the terms "first", "second", "third", etc. may be used in the present specification to describe various types of information, the information should not be limited to these terms. These terms are merely used to distinguish between the same type of information. For example, without departing from the scope of the present specification, first information can also be referred to as second information, and similarly, second information can also be referred to as first information. Depending on the context, the word "if" as used here can be explained as "while", "when", or "in response to determining".

It is well known that many machine learning tasks need to be trained by using a large amount of data. Especially, for some deep learning tasks, used training data even reaches an order of magnitude of TB or PB (1 TB=1024 GB and 1 PB=1024 TB). When these machine learning tasks are executed, it is very important to ensure data security and avoid privacy leakage.

In some cases, a machine learning model can be obtained through joint training of data provided by a plurality of data holders. Each data holder can provide a part of training sample data, and the training sample data provided by different data holders can have different dimensions. The training sample data provided by the data holders can be integrated to obtain training sample data having richer dimensions, so that a model with a better effect is trained. However, in the big data era, data is a very valuable resource. When contributing training sample data of a data holder, the data holder does not expect to share the training sample data wholly intact, so as to prevent the data from being maliciously stolen by other data holders. Based on this, it is necessary to take some measures to ensure data security.

In other cases, the machine learning model can also be obtained through training of data of an individual data holder. In the method, although data may not be maliciously stolen by other data holders as described above, to prevent a developer from accessing original training data (data related to personal privacy of a user such as a user face image and a user account number) during model training, it is also necessary to take protection measures for the original training data.

In related technologies, federated learning, secure multi-party computation, and other methods can be used to ensure data security. In these methods, a model can be trained by using a third party (namely, a party different from each data holder). Each data holder can encrypt the training sample data of the data holder, and send the encrypted training sample data to the third party. The third party can invoke a trusted execution environment (TEE) to train the model, thereby ensuring data security.

The TEE is a secure area on a device processor that can ensure security, confidentiality, and integrity of code and data that are loaded into the environment. The TEE provides an isolated execution environment, and provides security features including isolated execution, integrity of trusted applications, confidentiality of trusted data, secure storage, etc. In general, the TEE can provide a higher level of security than an operating system.

However, if a model is trained in the TEE, the following problems exist. On one hand, when a plurality of data holders exist, the third party needs to create a corresponding TEE for each data holder, and operations of training the model, updating model parameters, etc. are performed in the TEE corresponding to each data holder. Consequently, huge calculation overheads are generated in the TEE, and communication between the TEEs also brings a huge communication amount. On the other hand, even if only one data holder exists, when faced with massive training sample data of deep machine learning tasks, training the model by using the TEE based on the massive training sample data also brings huge calculation pressure to the TEE.

The present specification provides a TEE-based model training method.

Figure 1:
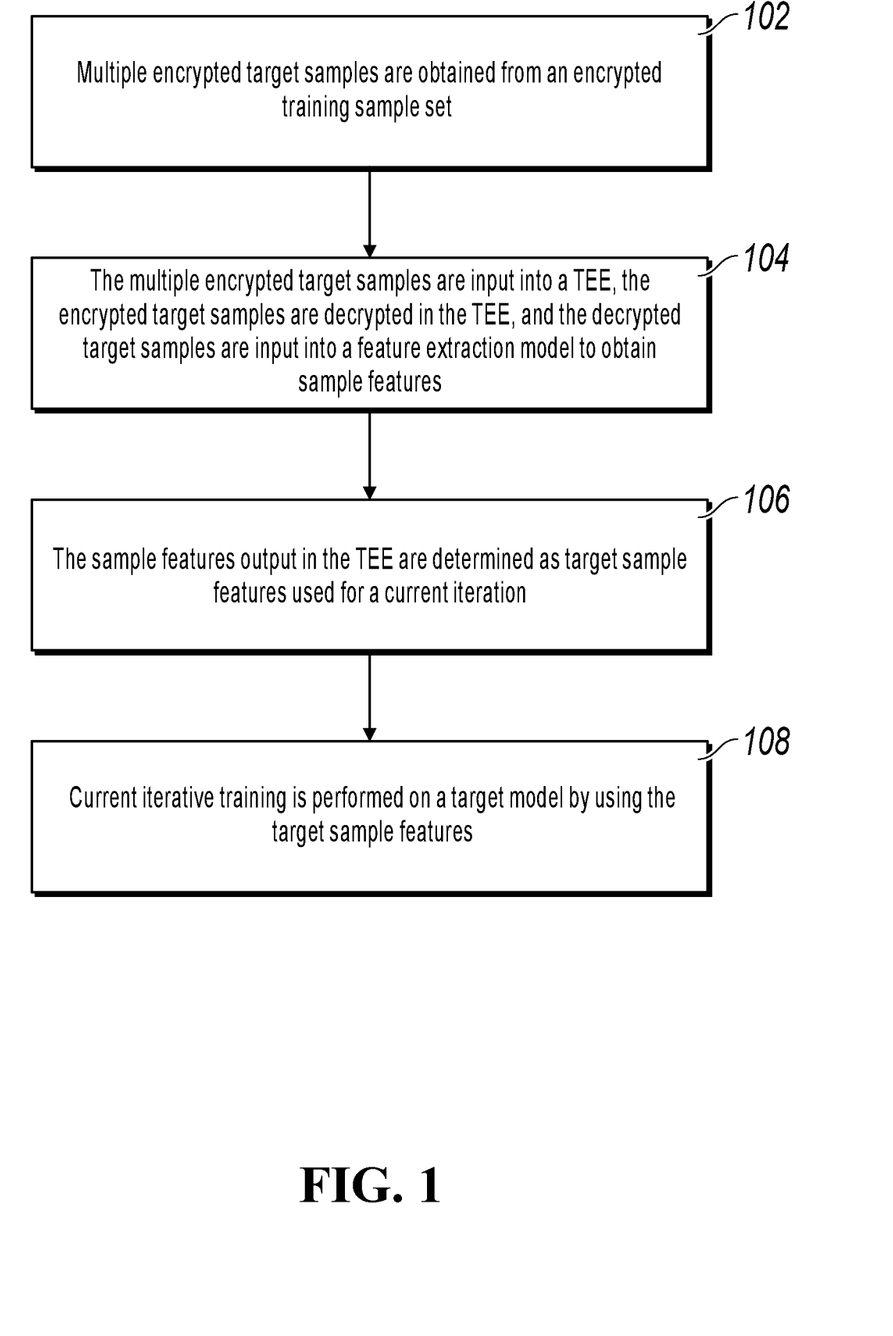
FIG. 1 is a schematic flowchart illustrating a TEE-based model training method, according to one or more embodiments of the present specification.

FIG. 1 is a schematic flowchart illustrating a TEE-based model training method, according to one or more embodiments of the present specification.

The TEE-based model training method can be applied to an electronic device with a processor and a memory. This is not specifically limited in the present specification.

Referring to FIG. 1, the TEE-based model training method can include the following steps:

At step 102, multiple encrypted target samples are obtained from an encrypted training sample set.

At step 104, the multiple encrypted target samples are input into a TEE, the encrypted target samples are decrypted in the TEE, and the decrypted target samples are input into a feature extraction model to obtain sample features.

At step 106, the sample features output from the TEE are determined as target sample features used for a current iteration.

At step 108, current iterative training is performed on a target model by using the target sample features.

The previous steps are described in detail below.

In the embodiments, the TEE-based model training method is described by using an example in which one data holder exists. Moreover, in the embodiments, the target model can be trained by the data holder. Certainly, in other embodiments, the target model can be trained by a third party. This is not specifically limited in the present specification.

In the embodiments, the data holder can obtain some training samples in advance, and then encrypt the training samples to obtain an encrypted training sample set. For the encryption method, references can be made to the related technologies. No specific limitation is imposed in the embodiments.

The data holder can first obtain multiple encrypted target samples from the encrypted training sample set in a normal execution environment. The normal execution environment can be an execution environment other than the TEE.

After determining the encrypted target samples, the data holder can invoke the TEE to perform decryption processing on the encrypted target samples in the TEE. The decryption processing method corresponds to the encryption processing method, and references can also be made to the related technologies. Then, sample features of the target samples are extracted in the TEE for each decrypted target sample. For example, when the target model is a face recognition model, the sample features can be face features. For another example, when the target model is a risk prediction model, the sample features can be user ages, genders, transaction records, etc. This is not specifically limited in the embodiments. The extracted sample features are usually in the form of vectors, matrices, etc., and privacy information of the samples is not leaked.

In the embodiments, the sample features can be obtained by using the following method:

In an example, the sample features can be extracted according to a predetermined rule.

Information to be extracted can be designated, and then the information to be extracted is extracted from each target sample as a sample feature. For example, assume that a target sample is account information of a user. Information to be extracted can be designated as a name, an age, an identity card, and a residence of the user. For another example, assume that a target sample is historical transaction information of a user. Information to be extracted can be designated as a transfer amount, a transfer time, and payee information.

In the example, the sample features can also be converted into the forms of vectors, character strings, etc. For example, if the information to be extracted includes the residence of the user, assume that the residence of the user is Zhejiang, the sample features are determined as 1; or assume that the residence of the user is Beijing, the sample features are determined as 0. In the method, the sample features can be converted into the forms that are easily processed by a computer, the actual meanings of the sample features can be further weakened, thereby facilitating protection of privacy data.

Certainly, the previous example is merely used for description, and other methods can also be used in practice to extract sample features. This is not specifically limited in the embodiments.

In another example, the previous target samples can also be input to a feature extraction model in the TEE, and sample features can be obtained through prediction by using the feature extraction model. The feature extraction model can be trained in advance, or can be jointly trained with the target model during iterative training of the target model. This is not specifically limited in the embodiments.

In the embodiments, an iterative training method can be used to train the target model, and different sample features can be used to train the target model in each iteration.

In an example, the data holder can select a part of encrypted target samples from the encrypted training sample set in one iteration, input these encrypted target samples into the TEE to extract sample features (namely, the target sample features), and use these target sample features to train the target model in a current iteration. In a next iteration, another part of encrypted target samples can be obtained from the encrypted training sample set, and the previous steps are performed again, to perform iteration a plurality of times.

In another example, before iterative training begins, the data holder can also input the encrypted target samples in the encrypted training sample set into the TEE in advance to extract sample features, and then can store these sample features (either in the TEE or in the normal execution environment). In this case, in each time of iterative training, instead of obtaining the encrypted target samples, the data holder can directly obtain the target sample features required by the current iterative training based on a mapping relationship between the encrypted target samples and the sample features. This is not specifically limited in the embodiments.

In the embodiments, when the target model is trained by using the iterative training method, the following method can be used to determine whether a training requirement of the target model is satisfied.

For example, it can be determined whether a quantity of times of iterative training reaches a threshold, and the threshold can be manually set. If the threshold is reached, the training requirement is satisfied. Otherwise, the training requirement is not satisfied.

For another example, a loss corresponding to each iteration of the target model can be calculated based on a loss function, to determine whether the loss is less than a loss threshold. If the loss is less than the loss threshold, the training requirement is satisfied. Otherwise, the model parameters of the target model can be updated by using a gradient descent method, etc., and iterative training is performed again.

Certainly, other methods can also be used to determine whether the training of the target model has been completed. This is not specifically limited in the embodiments.

It can be seen from the previous description that in one or more embodiments of the present specification, the encrypted target samples are obtained from the encrypted training sample set, the encrypted target samples are decrypted by invoking the TEE, the decrypted target samples are input into the feature extraction model in the TEE to obtain the sample features, the sample features are determined as the target sample features used for the current iteration, and the target model is trained by using the target sample features. Iterative training can be performed on the target model a plurality of times based on the previous method, until the training requirement of the target model is satisfied.

By using the method described above, on one hand, compared with a procedure of training the entire target model in the TEE in the related technologies, in the method of the embodiments, only the feature extraction step that has a smaller calculation amount is performed in the TEE, and a relatively complex step of model training is performed in the normal execution environment, so that a calculation amount in the TEE is reduced, and processing pressure of the TEE is alleviated. In addition, in the method of the embodiments, only encrypted training samples and sample features, instead of original training sample data, are used in the normal execution environment, so that the original training sample data can be prevented from being leaked, and data security can be ensured.

Another TEE-based model training method provided in the present specification is described below.

In the method of the embodiments, a plurality of data holders can exist, and the data holders can jointly train a target model as an executive body for training the target model.

Figure 2:
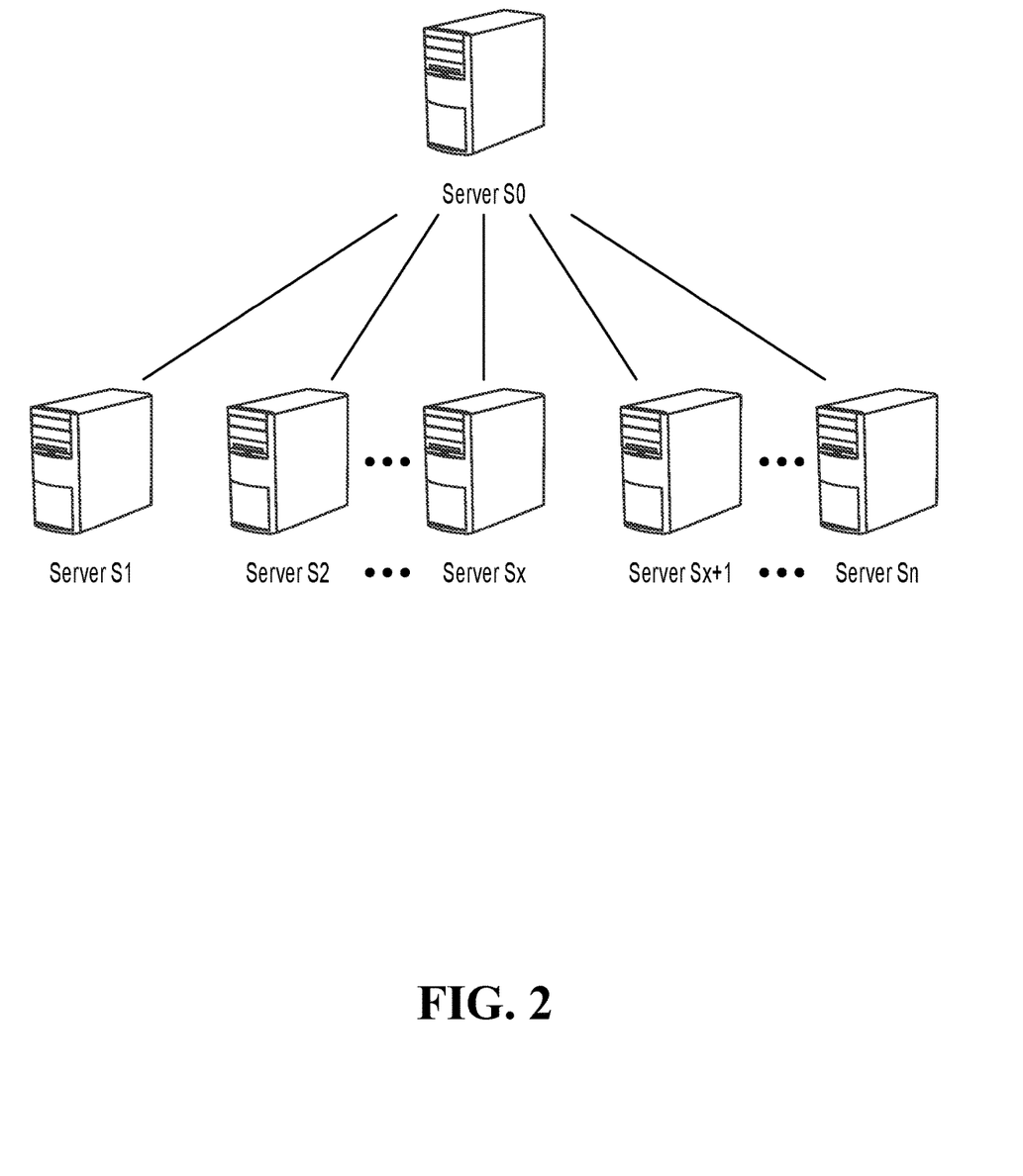
FIG. 2 is an architecture diagram, according to one or more embodiments of the present specification.

First, a scenario architecture of the embodiments is described. FIG. 2 is an architecture diagram, according to one or more embodiments of the present specification. In FIG. 2, there are servers S0, S1, S2, Sx, Sx+1, . . . , Sn.

Servers S1 to Sx can be servers corresponding to data holder A, and servers Sx+1 to Sn can be servers corresponding to data holder B. Each of training processes s1, s2, . . . , sn can be run on a respective one of servers S1-Sn, and a target model can be trained by using the n training processes together. Certainly, in other embodiments, a plurality of training processes can be run on one server. This is not specifically limited in the present specification. The training processes can be run independently of each other, that is, if one server fails, the training processes run on the other servers are not affected.

Server S0 can be understood as a main server that manages servers S1 to Sn, and server S0 can belong to data holder A, data holder B, or a third party. This is not specifically limited in the embodiments.

Each server in servers S1 to Sn can encrypt multiple pieces of locally stored training sample data, and send the encrypted training sample data to server S0. Server S0 can store the received encrypted training sample data to obtain an encrypted training sample set.

Server S0 can divide the encrypted training sample set into multiple portions. For example, S0 can divide the encrypted training sample set into n portions to obtain n training sample subsets, namely, S0(1), S0(2), ..., S0(n). In this case, the training processes run on servers S1, S2, ..., Sn each can obtain a corresponding training sample subset from S0 as a target sample. For example, training process S1 can obtain S0(1), s2 can obtain S0(2), ..., sn can obtain S0(n). Certainly, the training sample subset can be randomly obtained by each training process from S0. This is not specifically limited in the embodiments. After obtaining the corresponding training sample subset, the training process on each server can also store the training sample subset locally for subsequent calculation.

Certainly, in other embodiments, server S0 may not exist. This is not specifically limited in the present specification.

By using the method, a large amount of encrypted training sample data can be divided into multiple portions, and each training process only needs to obtain a corresponding smaller portion of encrypted training sample data, so that calculation pressure of the server can be alleviated, and calculation efficiency can be improved.

Figure 3:
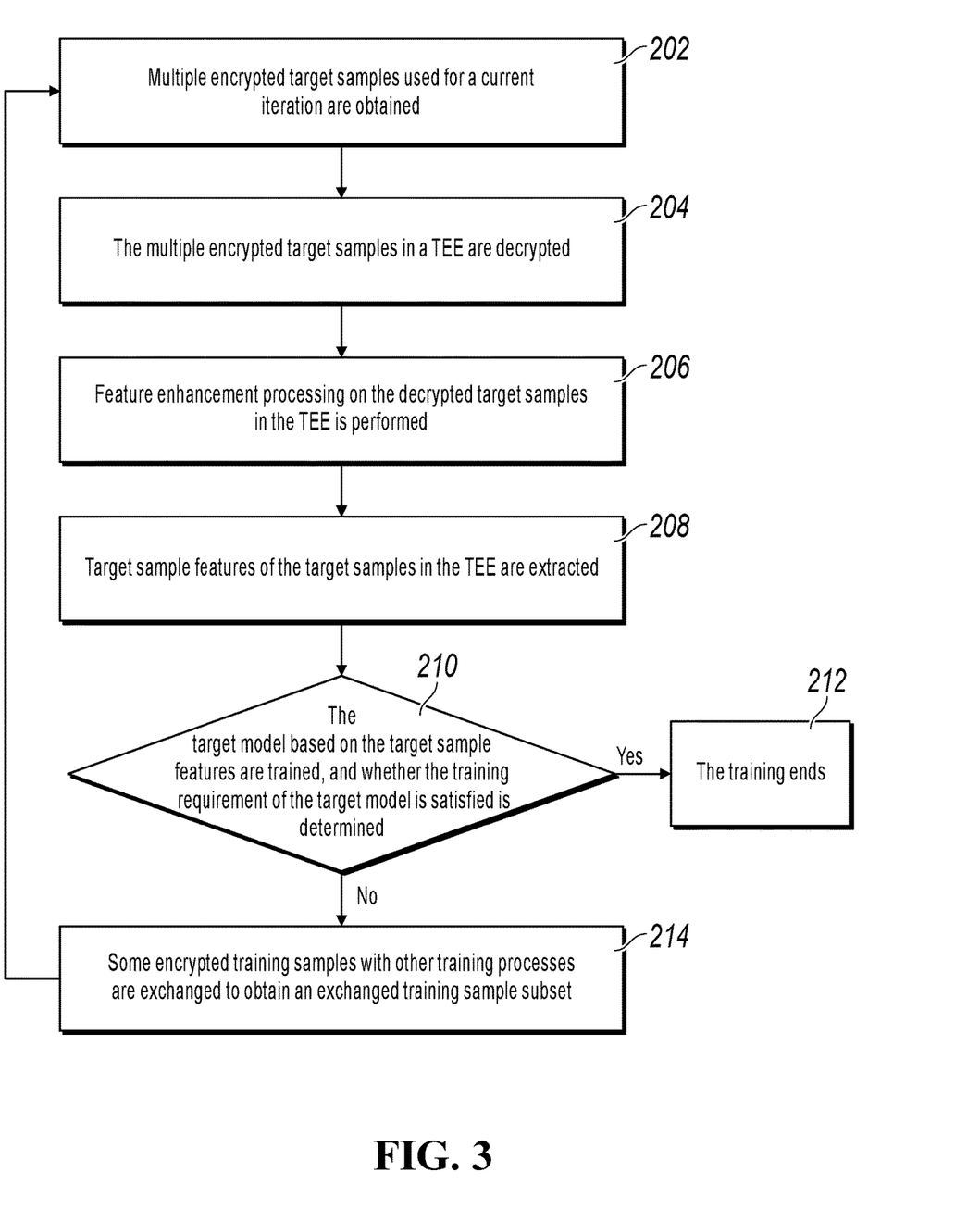
FIG. 3 is a schematic flowchart illustrating another TEE-based model training method, according to one or more embodiments of the present specification.

FIG. 3 is a schematic flowchart illustrating another TEE-based model training method, according to one or more embodiments of the present specification.

In the embodiments, each training process on servers S1, S2, ..., Sn can perform the following steps for iterative training, until a training requirement of a target model is satisfied.

At step 202, multiple encrypted target samples used for a current iteration are obtained.

In the present step, during the first iterative training, the training process can obtain a corresponding training sample subset from server S0, and determine encrypted training samples in the training sample subset as the encrypted target samples of the current iteration.

During non-first iterative trainings, each training process can obtain an exchanged training sample subset after step 214 is performed in a previous iteration, and then determine encrypted training samples in the exchanged training sample subset as the encrypted target samples of the current iteration. The exchange method is described in detail in the subsequent step 214.

At step 204, the multiple encrypted target samples in a TEE are decrypted.

In the present step, the training process can invoke the TEE, and decrypt the encrypted target samples in the TEE.

The encryption method for target samples can be a data encryption standard (DES) method, an advanced encryption standard (AES) method, a triple data encryption algorithm (3DES) method, a Rivest-Shamir-Adleman (RSA) method, etc., or can be other encryption methods in related technologies. This is not specifically limited in the embodiments. For details of the encryption and decryption methods, references can be made to the related technologies. Details are omitted here for simplicity.

It is worthwhile to note that in an example of the embodiments, each training process can have a corresponding TEE, and TEEs are not shared between the training processes. In this case, each training process can directly invoke the corresponding TEE when performing step 204.

In other examples of the embodiments, one TEE can also be shared by the training processes, so that each training process can invoke the shared TEE when executing step 204.

In another example of the embodiments, different data holders can have different TEEs. For example, when there are two data holders: data holder A and data holder B, TEE(A) corresponding to data holder A and TEE(B) corresponding to data holder B can exist. In this case, training processes corresponding to the two data holders can invoke respective TEEs when performing step 204.

Certainly, other methods can also be used in other examples. This is not specifically limited in the embodiments.

At step 206, feature enhancement processing on the decrypted target samples in the TEE is performed.

In the present step, feature enhancement processing can be performed on the decrypted target samples in the TEE to facilitate subsequent extraction of sample features in step 208.

For example, when the target sample is an image, the feature enhancement processing can include one or more of the following: cropping, overturning, rotating the image based on a predetermined angle, graying, changing pixel values of pixels in the image, etc.

For another example, when the target sample is text, the feature enhancement processing can include one or more of the following: segmenting words, filtering punctuations, removing stop words, converting the text into vectors, etc.

Certainly, other feature enhancement processing methods can also be used in other examples. This is not specifically limited in the embodiments.

At step 208, target sample features of the target samples in the TEE are extracted.

In the embodiments, the target samples can be input into a feature extraction model in the TEE, and the target sample features are determined based on an output result of the feature extraction model.

It is worthwhile to note that in the present step, training processes on servers S1, S2, ..., Sn can use the same feature extraction model to predict sample features, or can use a plurality of feature extraction models to predict sample features. For example, each training process corresponds to one feature extraction model (that is, there are n feature extraction models when there are n training processes).

At step 210, the target model based on the target sample features are trained, and whether the training requirement of the target model is satisfied is determined.

In the present step, the training process can use the extracted target sample features to train the target model. The training process can also determine whether the training requirement of the target model is satisfied.

For example, a first gradient value corresponding to the target model in the current iteration can be calculated based on a loss function of the target model, and then it is determined whether the first gradient value is less than a gradient threshold. If yes, it is determined that the training requirement of the target model is satisfied, step 212 is performed, and the training ends. If no, it is determined that the training requirement of the target model is not satisfied, and step 214 is performed. For the method for calculating a gradient value, references can be made to the related technologies. Details are omitted here for simplicity.

In the example, if the training requirement of the target model is not satisfied, model parameters of the target model can be further updated based on the first gradient value, and the updated model parameters are used for next iterative training.

For example, when a large quantity of model parameters exist in the target model and convergence conditions of the model parameters are likely to be different, corresponding training processes can be designated for the model parameters. Each training process is responsible for calculating a related loss and a gradient value for a designated model parameter of the target model to update the model parameters. For a specific parameter update method, references can be made to the related technologies. Details are omitted here for simplicity.

In the example, when the feature extraction model is jointly trained with the target model mentioned in step 208, after the first gradient value corresponding to the target model is obtained in the normal execution environment, a second gradient value can also be calculated based on the first gradient value, the second gradient value is input into the TEE, and the model parameters of the feature extraction model in the TEE are updated by using the second gradient value.

Figure 4:
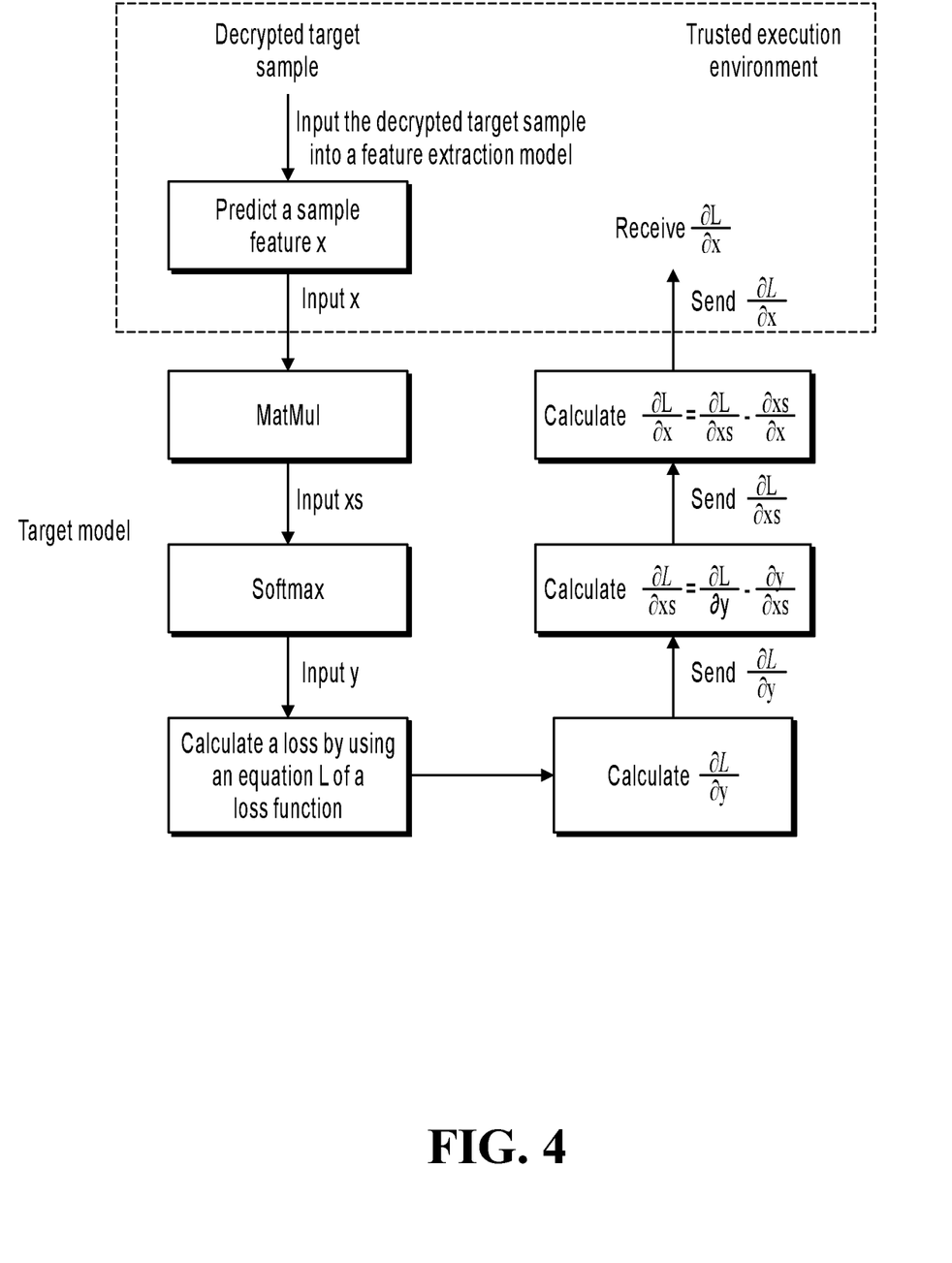
FIG. 4 is a schematic diagram illustrating a backpropagation method, according to one or more embodiments of the present specification.

A specific example is used below for description. Referring to FIG. 4, the decrypted target samples can be input into the feature extraction model in the TEE to obtain a target sample feature x. Then x can be input into the target model. Assume that the target model includes two layers: MatMul and Softmax. The target sample feature x is first input into the MatMul layer to obtain a result xs, and then xs is input into the Softmax layer to obtain a result y, where y is a prediction result of the target model.

When a gradient is calculated through backpropagation, a loss value can be calculated based on an equation L of a loss function, a partial derivative of L to y can be calculated to obtain $$\frac{\partial L}{\partial y},$$

then $$\frac{\partial L}{\partial y}$$

is propagated to the Softmax layer, and then a gradient at the Softmax layer is calculated based on $$\frac{\partial L}{\partial xs} = \frac{\partial L}{\partial y} \cdot \frac{\partial y}{\partial xs},$$

where $$\frac{\partial y}{\partial xs}$$

can be calculated based on a function at the Softmax layer.

$$\frac{\partial L}{\partial xs}$$

is propagated to the MatMul layer, and then a gradient at the MatMul layer is calculated based on $$\frac{\partial L}{\partial x} = \frac{\partial L}{\partial xs} \cdot \frac{\partial xs}{\partial x},$$

where $$\frac{\partial xs}{\partial x}$$

can also be calculated based on a function at the MatMul layer.

$$\frac{\partial L}{\partial x}$$

can be finally input into the ILL to use $$\frac{\partial L}{\partial x}$$

to update the model parameters of the feature extraction model.

Certainly, the previous example is merely used for description, and the target model may not be the structure including MatMul and Softmax in practice. This is not specifically limited in the present specification.

At step 214, some encrypted training samples are exchanged with one or more other training processes to obtain an exchanged training sample subset.

In the present step, each training process can exchange some encrypted training samples with one or more other training processes, and then the exchanged sub-training samples are used as target samples in a next iteration.

In an example, the exchange can be finished by various training processes.

For example, each training process can send encrypted training samples with a predetermined proportion in a training sample subset of the training process to a first designated training process, and then delete the training samples from the training sample subset of the training process. The training process can receive encrypted training samples sent by a second designated training process, and add the encrypted training samples sent by the second designated training process into a training sample subset of the training process, to finally obtain the exchanged training sample subset.

Figure 5:
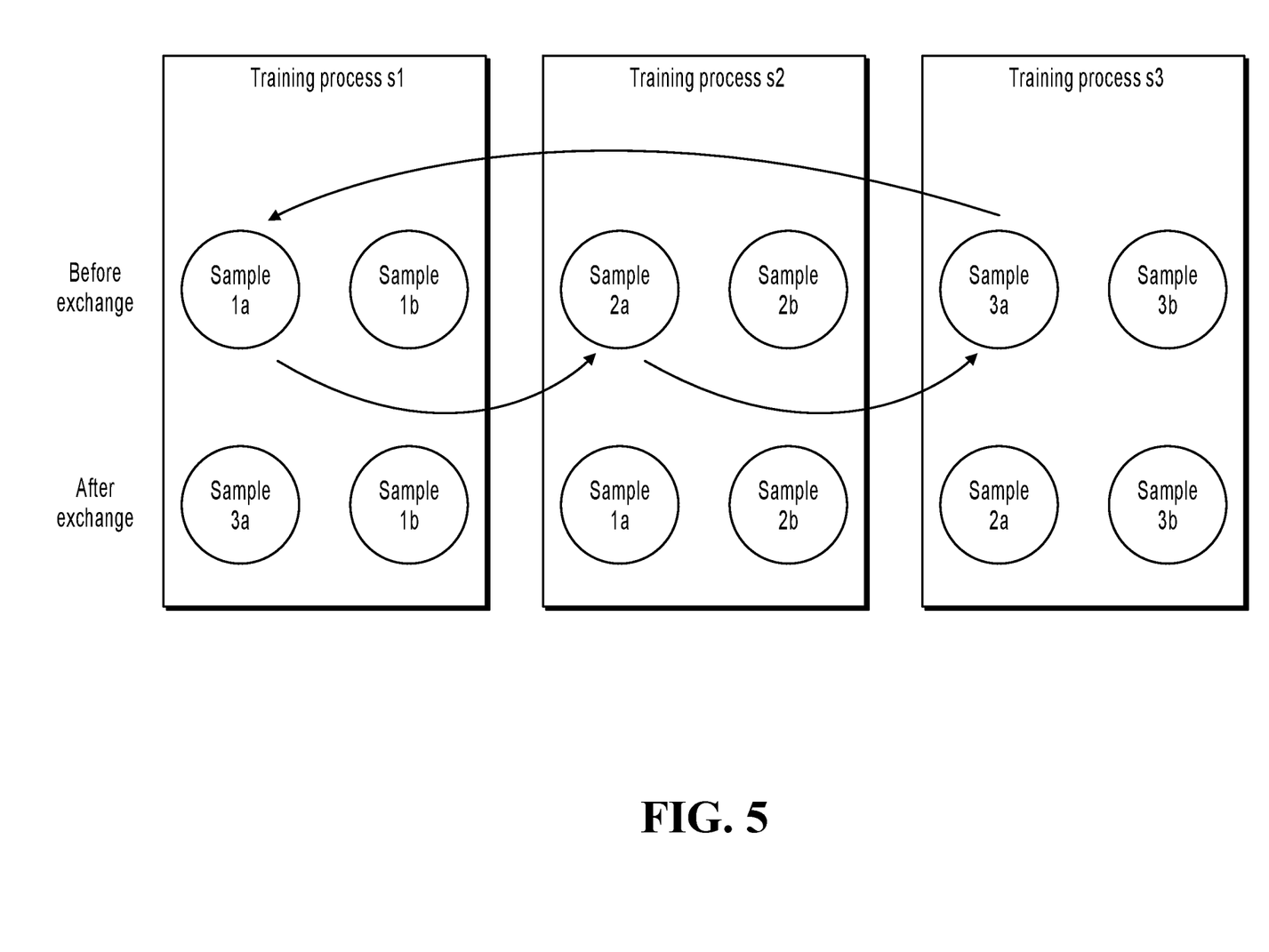
FIG. 5 is a schematic diagram illustrating an operation of exchanging encrypted training samples, according to one or more embodiments of the present specification.

A specific example is used below for description. FIG. 5 is a schematic diagram illustrating an operation of exchanging encrypted training samples, according to one or more embodiments of the present specification.

In FIG. 5, there are three training processes s1, s2, and s3, and each training process has two corresponding encrypted training samples. The encrypted training samples of training process s1 are samples 1a and 1b, the encrypted training samples of training process s2 are samples 2a and 2b, and the encrypted training samples of training process s3 are samples 3a and 3b. Assume that when s1, s2, and s3 exchange the encrypted training samples, the previously predetermined proportion is ½, that is, each training process sends one encrypted training sample in the two training samples of the training process, and each training process can obtain one encrypted training sample sent from another training processes, so that each training process still has two encrypted training samples after the exchange ends.

Referring to FIG. 5, if a first designated training process of s1 is s2 and a second designated training process is s3, s1 can send sample 1a to s2, and receive sample 3a sent by s3, and a training sample subset of s1 after the exchange includes sample 3a and sample 1b. Similarly, if a first designated training process of s2 is s3 and a second designated training process is s1, s2 can send sample 2a to s3, and receive sample 1a sent by s1, and a training sample subset of s2 after the exchange includes sample 1a and sample 2b. If a first designated training process of s3 is s1 and a second designated training process is s2, s3 can send sample 3a to s1, and receive sample 2a sent by s2, and a training sample subset of s3 after the exchange includes sample 2a and sample 3b.

Certainly, the previous example is merely used for description, and other methods for exchanging encrypted training samples can also be used in other cases. This is not specifically limited in the embodiments.

In another example, the exchange can be completed by an exchange process.

For example, an exchange process can be run on server S0 in FIG. 2, and server S0 can communicate with servers S1, S2, . . . , Sn. After performing step 210, training processes on servers S1, S2, . . . , Sn determine that the training requirement of the target model is not satisfied. In this case, each training process can send a notification to server S0 to notify server S0 to run the exchange process. Server S0 can run the exchange process after receiving notifications sent by a total of n training processes on servers S1, S2, . . . , Sn, or can run the exchange process after receiving notifications sent by a predetermined quantity of training processes. For example, the predetermined quantity can be n−5.

The exchange process can exchange the training sample subset of each training process by using the previous similar method or other methods. For example, the exchange process can obtain training sample subsets corresponding to all training processes, disorder and rearrange encrypted training samples in the training sample subsets, and then divide the rearranged encrypted training samples randomly into a plurality of portions to obtain a plurality of exchanged training sample subsets.

Moreover, after the exchange is completed, server S0 can also send an exchange complete notification to servers S1, S2, . . . , Sn, so that the training processes on servers S1, S2, . . . , Sn obtain new encrypted target samples in next iterative training.

In the previous method, the encrypted training samples are exchanged, recombined, and trained, and different combination methods can be used to train a model to obtain the model with better performance. In addition, after each training process exchanges encrypted training samples of the training process, the encrypted training samples can be input into the TEE again in the next iterative training to extract sample features. Because feature enhancement is performed on the training samples before the sample features are extracted, for example, for image samples, enhancement processing such as image random cropping and random pixel value changing can be performed on an image, sample features extracted after enhancement processing is performed on the same training sample each time are likely to be different, the model can be trained by using as many sample features as possible, and model performance can also be improved.

Certainly, in addition to exchanging encrypted training samples based on the previous method, each training process can exchange target sample features directly, and the method for exchanging target sample features can be similar to the previous method for exchanging encrypted target samples. In this case, in the next iterative training, each training process can directly use the target sample features obtained after exchange for training, without performing the step of inputting the encrypted training samples into the TEE for feature extraction again.

In the embodiments, the method can be used to iteratively train the target model, until the trained target model is obtained.

It is worthwhile to note that in the embodiments, during each iterative training, in consideration of a consistency requirements of a system, next iterative training can be performed after each training process completes a current iteration. In addition, in consideration of a stability requirement of the system, when there is a large quantity of training processes, some training processes may not complete iteration smoothly due to faults. In this case, it is not necessary to wait for all the training processes to complete the current iteration. For example, a training process which is fast in calculation can continue a next iteration after completing the current iteration. However, a quantity of iteration steps of the training process which is fast in calculation, ahead of a training process which is slowest in calculation, can be set to be not more than x. A value of x can be predetermined, e.g., manually. As such, a waiting time can be saved, and a stability of the system can be maintained as a whole. Certainly, other methods can also be selected in practice. This is not specifically limited in the embodiments.

It can be seen from the previous description that, in one or more embodiments of the present specification, a plurality of training processes can be started to perform iterative training of a target model. Each training process can obtain a corresponding training sample subset as target samples in the iterative training process, invoke a TEE to extract sample features of the target samples, and then train the target model by using the sample features in a normal execution environment, so that the data security is ensured.

A plurality of training processes are used to train the target model. First, the plurality of training processes can be run simultaneously, and training efficiency is improved. Second, because a large amount of training sample data needs to be used during training of the target model, the training sample data is divided and then sent to the plurality of training processes for execution. Each training process only needs to be responsible for processing a part of training sample data, and processing pressure of a device can be alleviated. Third, when a quantity of model parameters of the target model is large, the model parameters are assigned to each training process respectively, each training process is responsible for updating corresponding model parameters, and the plurality of training processes jointly train the target model.

Corresponding to the previous embodiments of the TEE-based model training method, the present specification further provides embodiments of a TEE-based model training apparatus.

Figure 6:
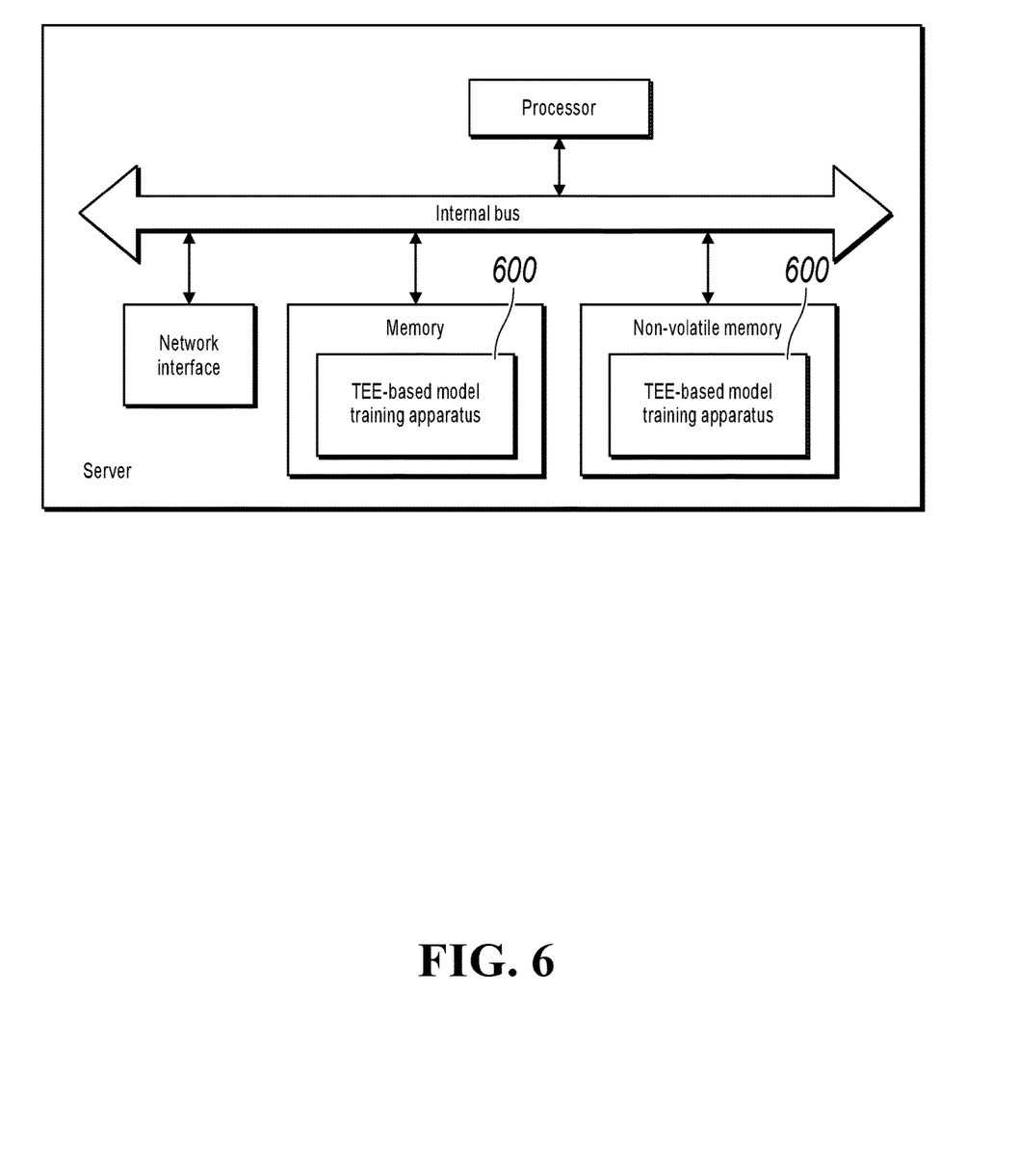
FIG. 6 is a schematic structural diagram illustrating a TEE-based model training apparatus, according to one or more embodiments of the present specification.

The embodiments of the TEE-based model training apparatus of the present specification can be applied to an electronic device. The apparatus embodiments can be implemented by software or hardware or a combination of hardware and software. For example, the apparatus embodiments are implemented in software. As a logical apparatus, the apparatus is formed by reading corresponding computer program instructions in a non-volatile memory into a memory for running by a processor of an electronic device corresponding to the apparatus. From the hardware level, FIG. 6 shows a schematic structural diagram illustrating a TEE-based model training apparatus, according to the present specification. In addition to a processor, a memory, a network interface, and a non-volatile memory shown in FIG. 6, the TEE-based model training apparatus in the embodiments can generally include other hardware based on actual functions of the electronic device. Details are omitted here for simplicity.

Figure 7:
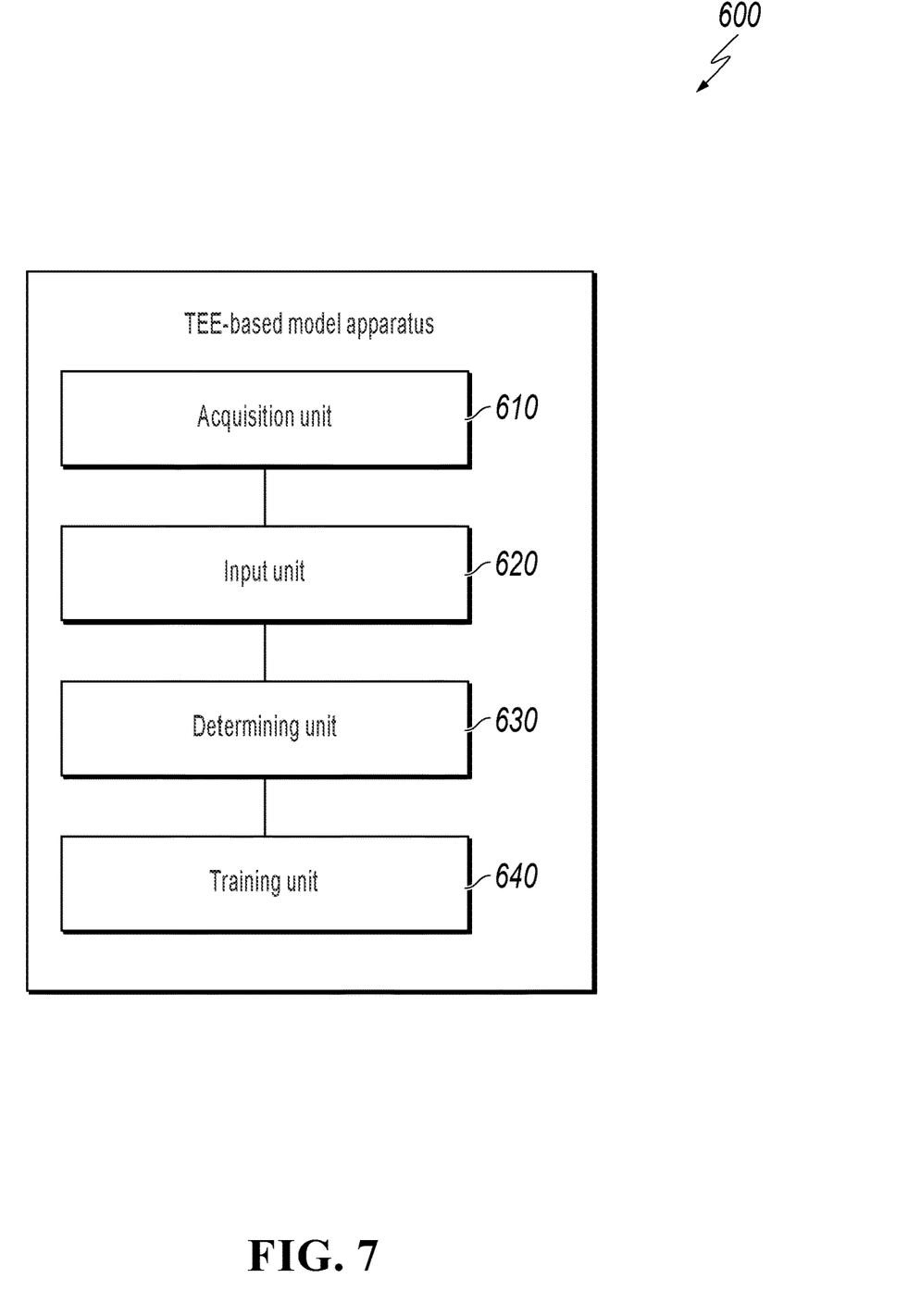
FIG. 7 is a block diagram illustrating a TEE-based model training apparatus, according to one or more embodiments of the present specification.

FIG. 7 is a block diagram illustrating a TEE-based model training apparatus, according to one or more embodiments of the present specification.

Referring to FIG. 7, the TEE-based model training apparatus 600 can be applied to the previous electronic device shown in FIG. 6, and includes an acquisition unit 610, an input unit 620, a determining unit 630, and a training unit 640.

The acquisition unit 610 is configured to obtain multiple encrypted target samples from an encrypted training sample set.

The input unit 620 is configured to input the multiple encrypted target samples into a TEE, decrypt the encrypted target samples in the TEE, and input the decrypted target samples into a feature extraction model to obtain sample features.

The determining unit 630 is configured to determine the sample features output in the TEE as target sample features used for a current iteration.

The training unit 640 is configured to perform current iterative training on a target model by using the target sample features.

Optionally, the training unit 640 is configured to determine a first gradient value corresponding to the target model in the current iteration based on a loss function of the target model; and update model parameters of the target model by using the first gradient value.

The training unit is further configured to calculate a second gradient value corresponding to the feature extraction model in the current iteration based on the first gradient value; and update model parameters of the feature extraction model by using the second gradient value.

Optionally, before inputting the decrypted target samples into the feature extraction model, the input unit 620 is further configured to perform feature enhancement processing on the decrypted target samples in the TEE.

Optionally, the apparatus iteratively trains the target model based on a plurality of training processes.

When the acquisition unit 610 obtains the multiple encrypted target sample, each training process performs the following operations: during a first iteration, obtaining a training sample subset corresponding to a current training process, and determining encrypted training samples in the training sample subset as encrypted target samples of the current iteration; and during a non-first iteration, exchanging some encrypted training samples with a designated training process to obtain encrypted target samples of the current iteration.

Optionally, when the acquisition unit 610 exchanges some encrypted training samples with the designated training process, each training process sends encrypted training samples with a predetermined proportion in a corresponding training sample subset to a first designated training process; and receives encrypted training samples sent by a second designated training process.

Optionally, each training process is used to obtain designated model parameters of the target model through training.

Optionally, the training unit 640 is further configured to perform the following operation for each training process: exchanging some target sample features with a designated training process to obtain exchanged target sample features of a current training process for a next iteration, and training the target model by using the exchanged target sample features in the next iteration.

For a specific implementation process of functions of units in the previous apparatus, refer to an implementation process of corresponding steps in the previous method. Details are omitted here for simplicity.

Because the apparatus embodiments basically correspond to the method embodiments, for related parts, references can be made to related descriptions in the method embodiments. The previously described apparatus embodiments are merely examples. The units described as separate parts can or does not have to be physically separate, and parts displayed as units can or does not have to be physical units, can be located in one position, or can be distributed on a plurality of network units. Some or all of the modules can be selected based on actual needs to achieve the objectives of the solutions of the present specification. A person of ordinary skill in the art can understand and implement the embodiments without creative efforts.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smart phone, a personal digital assistant, a media player, a navigation device, an email receiving and transmitting device, a game console, a tablet computer, a wearable device, or any combination of these devices.

Corresponding to the previous embodiments of the TEE-based model training method, the present specification further provides a TEE-based model training apparatus that includes a processor and a memory for storing machine executable instructions. The processor and the memory are typically interconnected by an internal bus. In other possible implementations, the device may also include an external interface to enable communication with other devices or parts.

In the embodiments, by reading and executing the machine executable instructions that are stored in the memory and that correspond to TEE-based model training logic, the processor is enabled to obtain multiple encrypted target samples from an encrypted training sample set; input the multiple encrypted target samples into a TEE, decrypt the encrypted target samples in the TEE, and input the decrypted target samples into a feature extraction model to obtain sample features; determine the sample features output in the TEE as target sample features used for a current iteration; and perform current iterative training on a target model by using the target sample features.

Optionally, when performing current iterative training on the target model by using the target sample features, the processor is enabled to determine a first gradient value corresponding to the target model in the current iteration based on a loss function of the target model; and update model parameters of the target model by using the first gradient value.

The processor is further enabled to calculate a second gradient value corresponding to the feature extraction model in the current iteration based on the first gradient value; and update model parameters of the feature extraction model by using the second gradient value.

Optionally, before inputting the decrypted target samples into the feature extraction model, the processor is further enabled to perform feature enhancement processing on the decrypted target samples in the TEE.

Optionally, the apparatus iteratively trains the target model based on a plurality of training processes.

When each training process obtains multiple target samples used for the current iteration, the processor is enabled to during a first iteration, obtain a training sample subset corresponding to a current training process, and determine encrypted training samples in the training sample subset as encrypted target samples of the current iteration; and during a non-first iteration, exchange some encrypted training samples with a designated training process to obtain encrypted target samples of the current iteration.

Optionally, when exchanging some encrypted training samples with the designated training process, the processor is enabled to: send, by each training process, encrypted training samples with a predetermined proportion in a corresponding training sample subset to a first designated training process; and receive encrypted training samples sent by a second designated training process.

Optionally, each training process is used to obtain designated model parameters of the target model through training.

Optionally, after performing current iterative training on the target model by using the target sample features, the processor is further enabled to perform the following operation for each training process: exchanging some target sample features with a designated training process to obtain exchanged target sample features of a current training process for a next iteration, and training the target model by using the exchanged target sample features in the next iteration.

Corresponding to the previous embodiments of the TEE-based model training method, the present specification further provides a computer readable storage medium. The computer readable storage medium stores a computer program, and the program is executed by a processor to implement the following steps: obtaining multiple encrypted target samples from an encrypted training sample set; inputting the multiple encrypted target samples into a TEE, decrypting the encrypted target samples in the TEE, and inputting the decrypted target samples into a feature extraction model to obtain sample features; determining the sample features output in the TEE as target sample features used for a current iteration; and performing current iterative training on a target model by using the target sample features.

Optionally, the performing current iterative training on a target model by using the target sample features includes: determining a first gradient value corresponding to the target model in the current iteration based on a loss function of the target model; and updating model parameters of the target model by using the first gradient value.

The following is further included: calculating a second gradient value corresponding to the feature extraction model in the current iteration based on the first gradient value; and updating model parameters of the feature extraction model by using the second gradient value.

Optionally, before the inputting the decrypted target samples into a feature extraction model, the following is further included: performing feature enhancement processing on the decrypted target samples in the TEE.

Optionally, the target model is iteratively trained based on a plurality of training processes.

A procedure of obtaining multiple target samples by each training process includes: during a first iteration, obtaining a training sample subset corresponding to a current training process, and determining encrypted training samples in the training sample subset as encrypted target samples of the current iteration; and during a non-first iteration, exchanging some encrypted training samples with a designated training process to obtain encrypted target samples of the current iteration.

Optionally, the exchanging some encrypted training samples with a designated training process includes: sending, by each training process, encrypted training samples with a predetermined proportion in a corresponding training sample subset to a first designated training process; and receiving encrypted training samples sent by a second designated training process.

Optionally, each training process is used to obtain designated model parameters of the target model through training.

Optionally, after the performing current iterative training on a target model by using the target sample features, the following is further included: performing the following operation for each training process: exchanging some target sample features with a designated training process to obtain exchanged target sample features of a current training process for a next iteration, and training the target model by using the exchanged target sample features in the next iteration.

Specific embodiments of the present specification have been described previously. Other embodiments fall within the scope of the appended claims. In some cases, the actions or steps described in the claims can be performed in a different order than in one or more embodiments and can still achieve desired results. In addition, the processes described in the drawings do not necessarily require a specific order or sequential order shown in order to achieve the desired results. In some implementations, multitasking and parallel processing are also possible or may be advantageous.

The previous descriptions are merely preferred embodiments of the present application, and are not intended to limit the present specification. Any modifications, equivalent substitutions, improvements, etc. that come within the spirit and principles of the present specification are intended to be included within the scope of the present specification.

What is claimed is:
1. A computer-implemented method, comprising:
    obtaining encrypted target samples from an encrypted training sample set in a first execution environment;
    inputting the encrypted target samples into a second execution environment, wherein the second execution environment is a trusted execution environment (TEE) different from the first execution environment;
    decrypting the encrypted target samples in the TEE to obtain decrypted target samples;
    inputting the decrypted target samples into a feature extraction model in the TEE to determine sample features, each sample feature of the sample features comprising information extracted from a corresponding decrypted target sample of the decrypted target samples;
    determining the sample features output from the TEE as target sample features for a current iteration of a training process for a target model;
    performing, based on the target sample features, the current iteration on the target model in the first execution environment, wherein performing the current iteration comprises:
        determining a first gradient value corresponding to the target model in the current iteration based on a loss function of the target model; and updating model parameters of the target model based on the first gradient value;

calculating a second gradient value corresponding to the feature extraction model in the current iteration in the first execution environment based on (i) the first gradient value and (ii) one or more third gradient values, wherein the one or more third gradient values are determined based on at least one target sample value and a corresponding prediction result of the target model for the at least one target sample value;

inputting the second gradient value into the TEE; and updating model parameters of the feature extraction model in the TEE by using the second gradient value.

2. The computer-implemented method of claim 1, comprising:

before inputting the decrypted target samples into the feature extraction model in the TEE, performing feature enhancement processing on the decrypted target samples in the TEE.

3. The computer-implemented method of claim 1, wherein the target model is iteratively trained based on a plurality of training processes, and wherein, for each training process of the plurality of training processes:

for a first iteration, encrypted target samples are obtained by obtaining a training sample subset corresponding to a current training process of the plurality of training processes and determining encrypted training samples in the training sample subset as the encrypted target samples of the first iteration; and for a non-first iteration, encrypted target samples are obtained by exchanging encrypted training samples with a designated training process of the plurality of training processes to obtain the encrypted target samples of the non-first iteration.

4. The computer-implemented method of claim 3, wherein exchanging the encrypted training samples with the designated training process comprises:

sending encrypted training samples that are a predetermined proportion in a corresponding training sample subset to a first designated training process; and receiving encrypted training samples from a second designated training process.

5. The computer-implemented method of claim 3, wherein each of the plurality of training processes is configured to obtain designated model parameters of the target model.

6. The computer-implemented method of claim 3, comprising:

after performing the current iteration on the target model based on the target sample features, performing one or more subsequent operations for the current training process, comprising:

exchanging the target sample features with a corresponding training process to obtain exchanged target sample features for a next iteration of the current training process, and training the target model based on the exchanged target sample features in the next iteration.

7. The computer-implemented method of claim 6, comprising:

determining whether a training requirement of the target model is satisfied, wherein the one or more subsequent operations for the current training process are performed in response to determining that the training requirement of the target model is not satisfied.

8. The computer-implemented method of claim 7, wherein determining whether the training requirement of the target model is satisfied comprises:

determining whether a number of times of iterations for the current training process reaches a quantity threshold; or determining whether a loss corresponding to the current iteration of the target model is less than a loss threshold.

9. A non-transitory, computer-readable medium storing one or more instructions executable by a computer system to perform operations comprising:

obtaining encrypted target samples from an encrypted training sample set in a first execution environment;

inputting the encrypted target samples into a second execution environment, wherein the second execution environment is a trusted execution environment (TEE) different from the first execution environment;

decrypting the encrypted target samples in the TEE to obtain decrypted target samples;

inputting the decrypted target samples into a feature extraction model in the TEE to determine sample features, each sample feature of the sample features comprising information extracted from a corresponding decrypted target sample of the decrypted target samples;

determining the sample features output from the TEE as target sample features for a current iteration of a training process for a target model;

performing, based on the target sample features, the current iteration on the target model in the first execution environment, wherein performing the current iteration comprises:

determining a first gradient value corresponding to the target model in the current iteration based on a loss function of the target model; and updating model parameters of the target model based on the first gradient value;

calculating a second gradient value corresponding to the feature extraction model in the current iteration in the first execution environment based on (i) the first gradient value and (ii) one or more third gradient values, wherein the one or more third gradient values are determined based on at least one target sample value and a corresponding prediction result of the target model for the at least one target sample value;

inputting the second gradient value into the TEE; and updating model parameters of the feature extraction model in the TEE by using the second gradient value.

10. The non-transitory, computer-readable medium of claim 9, wherein the operations comprise:

before inputting the decrypted target samples into the feature extraction model in the TEE, performing feature enhancement processing on the decrypted target samples in the TEE.

11. The non-transitory, computer-readable medium of claim 9, wherein the target model is iteratively trained based on a plurality of training processes, and wherein, for each training process of the plurality of training processes:

for a first iteration, encrypted target samples are obtained by obtaining a training sample subset corresponding to a current training process of the plurality of training processes and determining encrypted training samples in the training sample subset as the encrypted target samples of the first iteration; and for a non-first iteration, encrypted target samples are obtained by exchanging encrypted training samples with a designated training process of the plurality of training processes to obtain the encrypted target samples of the non-first iteration.

12. The non-transitory, computer-readable medium of claim 11, wherein exchanging the encrypted training samples with the designated training process comprises:

sending encrypted training samples that are a predetermined proportion in a corresponding training sample subset to a first designated training process; and receiving encrypted training samples from a second designated training process.

13. The non-transitory, computer-readable medium of claim 11, wherein each training process of the plurality of training processes is configured to obtain designated model parameters of the target model through the training process on the target model.

14. The non-transitory, computer-readable medium of claim 11, wherein the operations comprise:

after performing the current iteration on the target model based on the target sample features, performing one or more subsequent operations for the current training process, comprising:

exchanging the target sample features with a corresponding training process to obtain exchanged target sample features for a next iteration of the current training process; and training the target model based on the exchanged target sample features in the next iteration.

15. The non-transitory, computer-readable medium of claim 14, wherein the operations comprise:

determining whether a training requirement of the target model is satisfied, wherein the one or more subsequent operations for the current training process are performed in response to determining that the training requirement of the target model is not satisfied, and wherein determining whether the training requirement of the target model is satisfied comprises:

determining whether a number of times of iterations for the current training process reaches a quantity threshold; or determining whether a loss corresponding to the current iteration of the target model is less than a loss threshold.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining encrypted target samples from an encrypted training sample set in a first execution environment;

inputting the encrypted target samples into a second execution environment, wherein the second execution environment is a trusted execution environment (TEE) different from the first execution environment;

decrypting the encrypted target samples in the TEE to obtain decrypted target samples;

inputting the decrypted target samples into a feature extraction model in the TEE to determine sample features, each sample feature of the sample features comprising information extracted from a corresponding decrypted target sample of the decrypted target samples;

determining the sample features output from the TEE as target sample features for a current iteration of a training process for a target model;

performing, based on the target sample features, the current iteration on the target model in the first execution environment, wherein performing the current iteration comprises:

determining a first gradient value corresponding to the target model in the current iteration based on a loss function of the target model; and updating model parameters of the target model based on the first gradient value;

calculating a second gradient value corresponding to the feature extraction model in the current iteration in the first execution environment based on (i) the first gradient value and (ii) one or more third gradient values, wherein the one or more third gradient values are determined based on at least one target sample value and a corresponding prediction result of the target model for the at least one target sample value;

inputting the second gradient value into the TEE; and updating model parameters of the feature extraction model in the TEE by using the second gradient value.

* * * * *